United States Patent
Takano et al.

(10) Patent No.: US 6,866,320 B2
(45) Date of Patent: Mar. 15, 2005

(54) BLOWER UNIT MOUNTING STRUCTURE AND METHOD FOR MOUNTING A BLOWER UNIT

(75) Inventors: Akira Takano, Tokyo (JP); Hikaru Sunohara, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/076,346

(22) Filed: Feb. 19, 2002

(65) Prior Publication Data

US 2002/0113453 A1 Aug. 22, 2002

(30) Foreign Application Priority Data

Feb. 20, 2001 (JP) .................................... P. 2001-044062

(51) Int. Cl.⁷ .............................................. B62D 25/14
(52) U.S. Cl. ...................................... 296/70; 296/192
(58) Field of Search ........................... 296/70, 72, 191, 296/192, 208, 203.02, 193.09, FOR 115, 194; 180/90; 280/229; 454/127, 143

(56) References Cited

U.S. PATENT DOCUMENTS

| | | | | |
|---|---|---|---|---|
| 3,876,228 A | * | 4/1975 | Hawkins et al. | 280/752 |
| 3,966,227 A | * | 6/1976 | Cameron | 180/90 |
| 4,223,754 A | * | 9/1980 | Mizuno et al. | 180/90 |
| 4,733,739 A | * | 3/1988 | Lorenz et al. | 180/90 |
| 5,082,078 A | * | 1/1992 | Umeda et al. | 180/90 |
| 5,333,901 A | * | 8/1994 | Barnes | 280/732 |
| 5,639,116 A | * | 6/1997 | Shimizu et al. | 180/90 |
| 5,685,598 A | | 11/1997 | Inoue et al. | |
| 5,707,100 A | * | 1/1998 | Suyama et al. | 296/192 |
| 5,762,395 A | * | 6/1998 | Merrifield et al. | 296/203 |
| RE36,167 E | * | 3/1999 | Barnes | 180/90 |
| 5,979,965 A | | 11/1999 | Nishijima et al. | |
| 5,997,078 A | * | 12/1999 | Beck et al. | 296/208 |
| 6,073,987 A | * | 6/2000 | Lindberg et al. | 296/70 |
| 6,196,588 B1 | * | 3/2001 | Sugawara | 280/779 |
| 6,231,116 B1 | * | 5/2001 | Naert et al. | 296/70 |
| 6,234,569 B1 | * | 5/2001 | Derleth et al. | 296/70 |
| 6,296,303 B1 | * | 10/2001 | Kamiya et al. | 296/72 |
| 6,305,733 B1 | * | 10/2001 | Rahmstorf et al. | 296/70 |
| 6,394,527 B2 | * | 5/2002 | Ohno et al. | 296/70 |
| 6,409,590 B1 | * | 6/2002 | Suzuki et al. | 296/70 |
| 6,422,633 B2 | * | 7/2002 | Neuss et al. | 296/70 |
| 6,582,011 B2 | * | 6/2003 | Palazzolo et al. | 296/208 |
| 6,601,902 B1 | * | 8/2003 | Rahmstorf et al. | 296/70 |
| 6,682,119 B1 | * | 1/2004 | Droulez | 296/39.3 |
| 2001/0047899 A1 | * | 12/2001 | Ikeda | 296/70 |
| 2002/0101093 A1 | * | 8/2002 | Berteaux et al. | 296/70 |
| 2002/0117842 A1 | * | 8/2002 | Takano et al. | 280/779 |

FOREIGN PATENT DOCUMENTS

| | | | | |
|---|---|---|---|---|
| DE | 2061932 | * | 4/1979 | |
| DE | 3634559 | * | 6/1987 | 296/70 |
| DE | 195 35 263 A1 | | 4/1996 | |
| DE | 196 26 441 A1 | | 1/1998 | |
| DE | 197 53 178 A1 | | 6/1999 | |
| EP | 0083701 | * | 7/1983 | 180/90 |
| FR | 2 795 379 | | 10/2000 | |
| JP | 56-149219 | * | 11/1981 | 180/90 |
| JP | 56-157631 | * | 12/1981 | 180/90 |
| JP | 59-18073 | * | 1/1984 | 180/90 |
| JP | 60-45435 | * | 3/1985 | 180/90 |
| JP | 60-222345 | * | 11/1985 | 180/90 |
| JP | 62-23813 | * | 1/1987 | 454/143 |
| JP | 6-37057 | | 5/1994 | |
| WO | 9926833 | * | 6/1999 | |

* cited by examiner

Primary Examiner—D. Glenn Dayoan
Assistant Examiner—H. Gutman
(74) Attorney, Agent, or Firm—McGinn & Gibb, PLLC

(57) ABSTRACT

An instrument panel is formed in such a manner as to be vertically divided into an upper panel and a lower panel along a transverse direction of the body of a vehicle. A steering support beam and a blower unit are integrally mounted on the lower panel to construct a unitized component before they are mounted on the vehicle body. After the unitized component is mounted on the vehicle body from an upper side of the lower panel, the upper panel is mounted on the vehicle body.

15 Claims, 3 Drawing Sheets

BLOWER UNIT MOUNTING STRUCTURE AND METHOD FOR MOUNTING A BLOWER UNIT

BACKGROUND OF THE INVENTION

The present invention relates to a structure and method for mounting a blower unit which is installed in the interior of an instrument panel.

As shown in, for example, JP-UM-A-6-37057, a cross beam (a steering support beam) extending transversely of a body of a vehicle such as an automobile is fixedly provided on the vehicle body in the interior of an instrument panel of the vehicle.

In general, the steering support beam functions to support a steering column, a blower unit and so on, on the vehicle body. Consequently, it is a general practice to mount the blower unit on the vehicle body after the steering support beam has been mounted on the vehicle body.

Incidentally, in general, the blower unit is fastened to a front bulkhead and a toe board of the vehicle body as well as to the steering support beam. Then, the blower unit is additionally fastened to the instrument panel from the interior of a glove box after the instrument panel has been mounted.

However, it is difficult to mount the blower unit to the front bulkhead and the toe board in a narrow passenger compartment with a long steering support beam that has been mounted on the vehicle body. In particular, when fastening the blower unit to the toe board, the mechanic is forced to do the fastening work from below the steering support beam with an uncomfortable posture. This work may lead to a risk that a mounting accuracy of the blower unit is deteriorated. In addition, it becomes difficult to fasten the blower unit, which has been so fastened with poor mounting accuracy, to the instrument panel. This work also may lead to a further risk that the mounting workability is deteriorated.

SUMMARY OF THE INVENTION

The present invention was made in these situations, and an object thereof is to provide a blower unit mounting structure and method which can improve the mounting workability and the mounting accuracy.

With a view to solving the problems, a blower unit mounting structure according to a first aspect of the present invention, comprises an instrument panel, a steering support beam and a blower unit. The instrument panel formed in such a manner as to be vertically divided into an upper panel and a lower panel along a transverse direction of a vehicle body. At least the steering support beam and the blower unit are assembled to the lower panel to form a unitized component. The unitized component is mounted on the vehicle body before the upper panel is mounted on the vehicle body.

A blower unit mounting structure according to a second aspect of the present invention further comprises a front bulkhead including a vertically wall surface with an opening, wherein a duct of the blower unit is connected to the opening for taking outside air into the blower unit.

A blower unit mounting structure according to a third aspect of the present invention further comprises a toe board having a recessed portion, wherein said blower unit comprises a leg portion extended toward the toe board side and engaged with the recessed portion.

A method for mounting a blower unit comprises the steps of: preparing an instrument panel including an upper panel and a lower panel that are vertically divided along a transverse direction of a vehicle body; forming a unitized component by assembling at least a steering support beam and a blower unit to the lower panel; mounting the unitized component on the vehicle body; and mounting the upper panel to the vehicle body.

It is preferable that the mounted for mounting a blower unit further comprises the steps of: preparing a recessed portion mounted on a tow board and a leg portion which is mounted on the blower unit and is extended toward the two board; and engaging the leg portion with the recessed portion.

DETAILED DESCRIPTION OF THE INVENTION

Referring to the appended drawings, a mode for carrying out the present invention will be described below. The drawings relate to a preferred embodiment of the present invention, in which FIG. 1 is a cross sectional view taken along the line I—I in FIG. 2, FIG. 2 is a perspective view of an instrument panel, FIG. 3 is a perspective view of a blower unit, and FIG. 4 is an exploded perspective view of the instrument panel.

Figure 1:
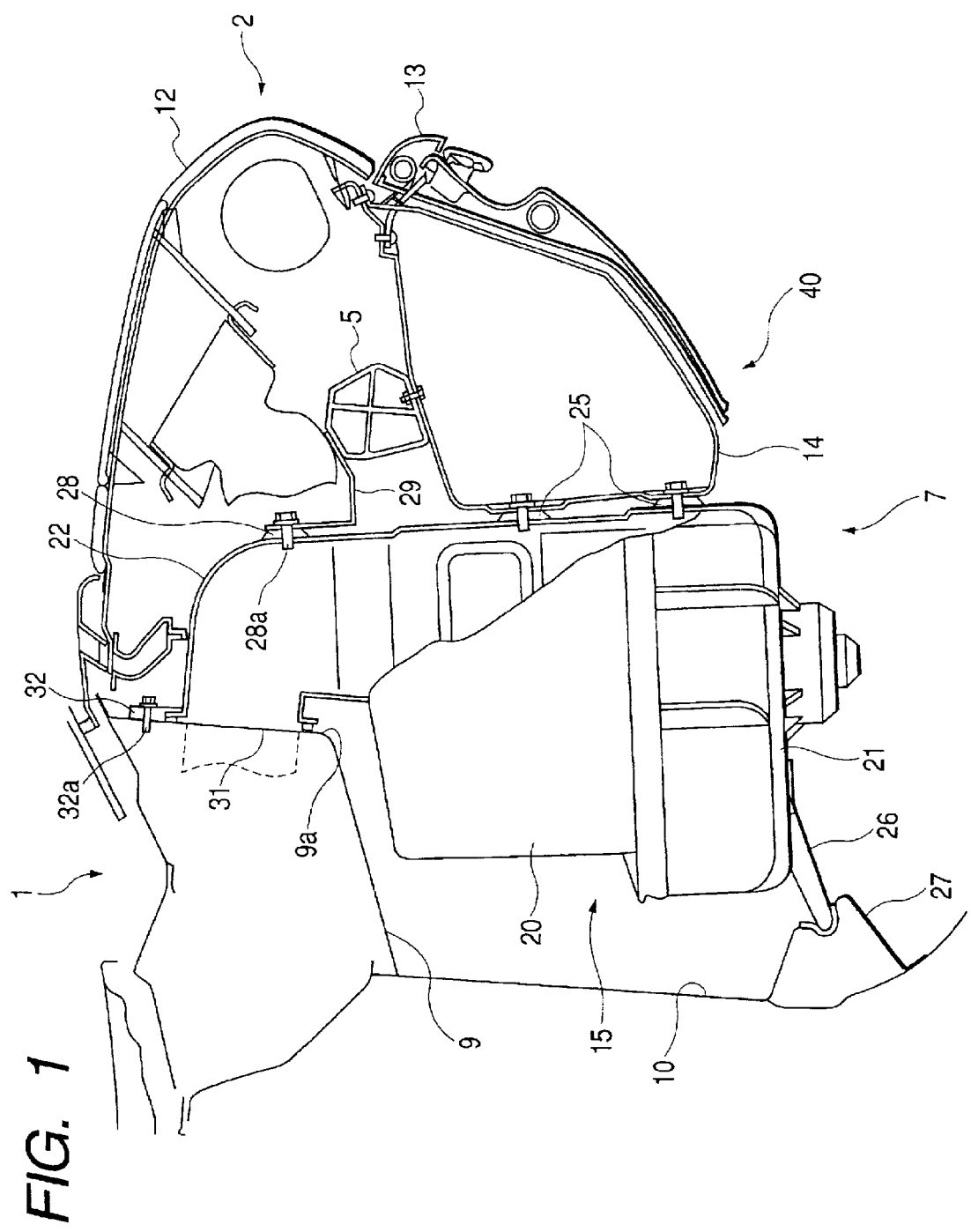
FIG. 1 is a cross-sectional view taken along the line I—I in FIG. 2.

In FIG. 1, reference numeral 1 denotes a vehicle body. An instrument panel 2 is mounted at the front of a passenger compartment of the vehicle body 1, and a steering support beam 5 is provided in the interior of the instrument panel 2 in such a manner as to extend transversely of the vehicle body 1. In addition, a blower unit 7 is disposed in the interior of the instrument panel 2. The blower unit 7 is supported on the instrument panel 2 and the steering support beam 5 at the rear thereof and is supported on a front bulkhead 9 and a toe board 10 of the vehicle body 1 at the front thereof.

Figure 2:
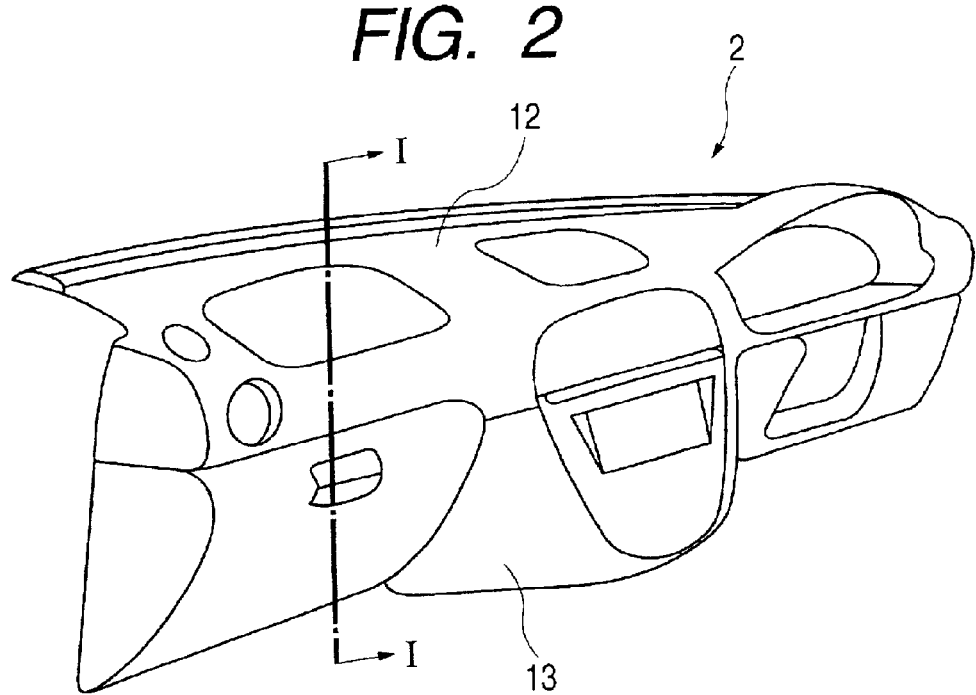
FIG. 2 is a perspective view of an instrument panel.
Figure 3:
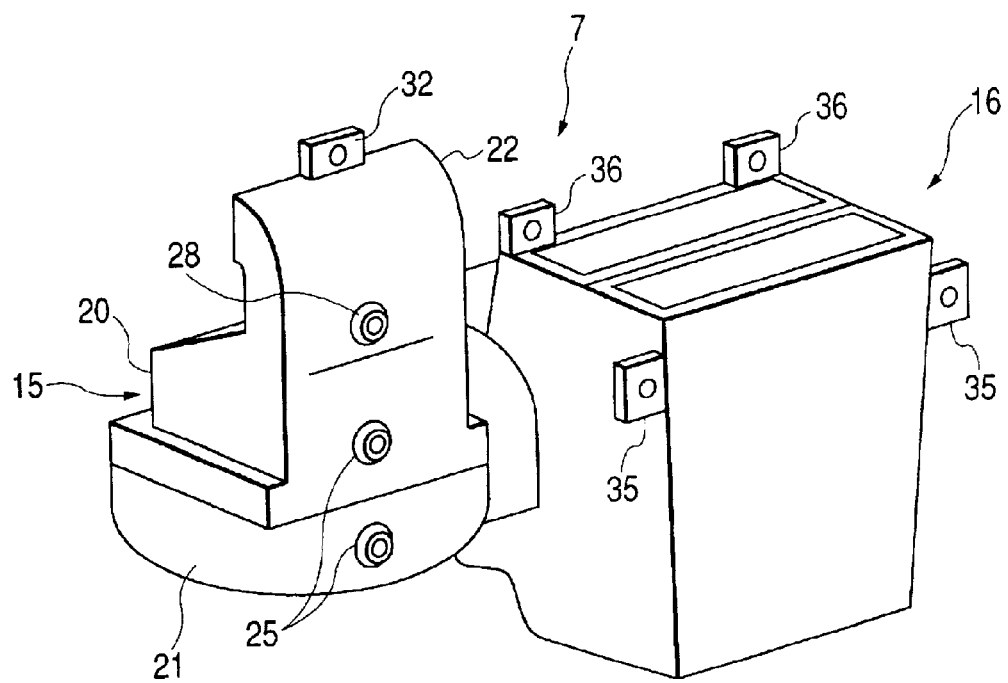
FIG. 3 is a perspective view of a blower unit.
Figure 4:
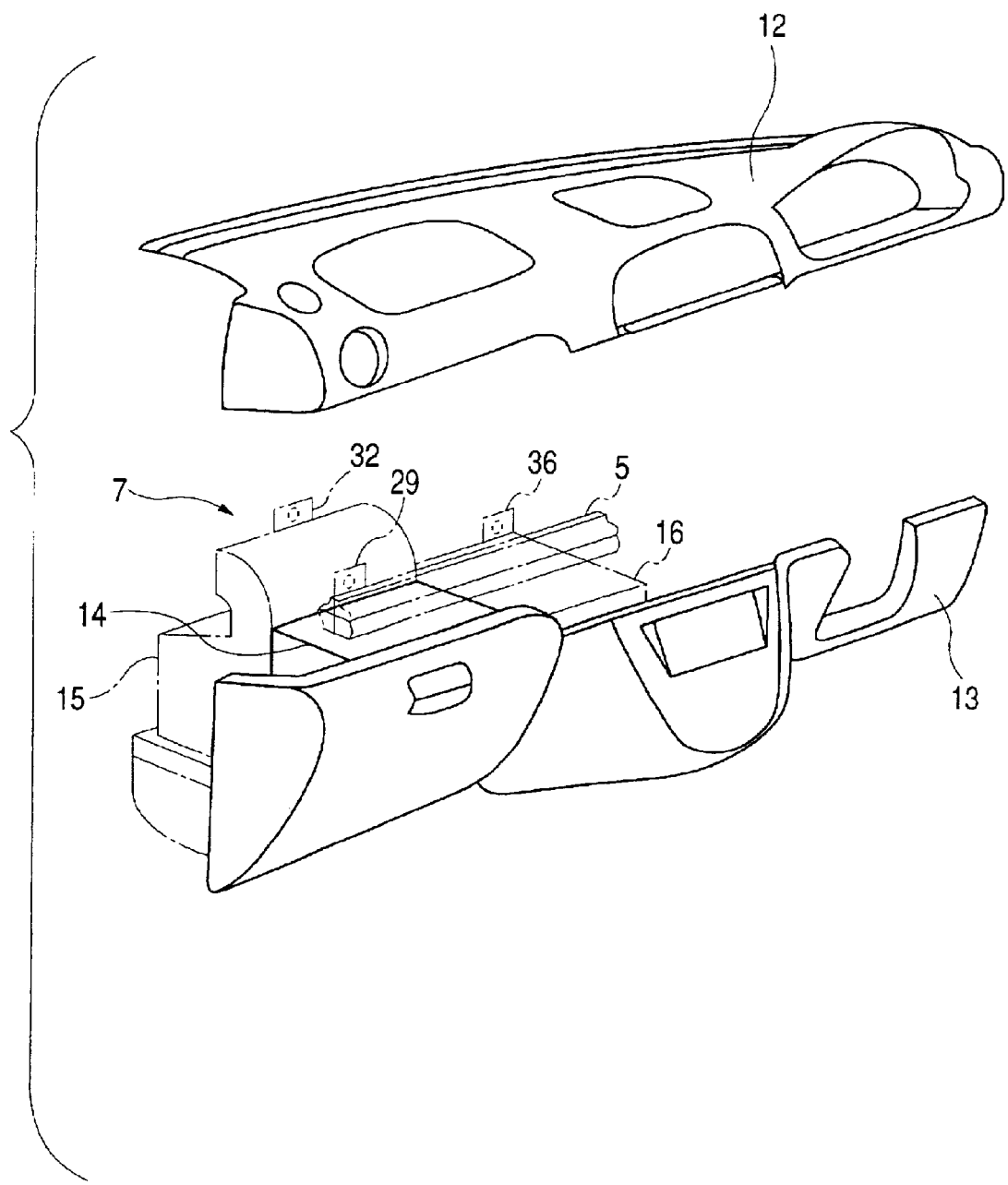
FIG. 4 is an exploded perspective view of the instrument panel.

To specifically describe the structure of the respective constituent members, as shown in FIGS. 2 and 4, the instrument panel 2 is formed in such a manner as to be divided vertically into an upper panel 12 and a lower panel 13 along the transverse direction of the vehicle body 1. In addition, these panels 12, 13 are constructed to individually be mounted to the vehicle body 1. In this case, the instrument panel 2 is vertically divided at, at least, a position where a glove box 14 is included in a lower panel 13 side.

Additionally, the steering support beam 5 includes mounting brackets (not shown) for attachment to the vehicle body 1, not shown, at ends thereof, and is mounted on the vehicle body 1 via these brackets. In addition, a part of the steering support beam 5 is disposed on an upper surface of the glove box 14 of the lower panel 13 (refer to FIG. 4) and is integrally fixed to the lower panel 13 through fastening with bolts from the interior of the glove box 14.

In addition, as shown in FIG. 3, a main part of the blower unit 7 is constituted by a blower main body 15 and a heater and ventilation unit 16 which are coupled to be a one-piece unit. The blower unit 7 is disposed along a wall surface of the glove box 14, and to be specific, the blower main body 15 is disposed along a front side of the glove box 14, and the heater and ventilation unit 16 is disposed along a right side of the glove box 14 (refer to FIG. 4). The blower unit 7 is integrally fixed to the lower panel 13 and the steering support beam 5.

As shown in FIG. 3, a main part of the blower main body 15 comprises a blower case 20, a blower motor 21 disposed below the blower case 20 and a duct 22 extending from an upper part of the blower case 20 for taking in outside air.

Rear sides of the blower case 20 and the blower motor 21 are shaped so as to be brought into abutment with the front side of the glove box 14. Bolt holes 25 are formed in the rear sides of the blower case 20 and the blower motor 21. Then, the blower main body 15 is integrally fixed to the lower panel 13 through fastening bolts into the bolt holes 25 from the interior of the glove box 14.

In addition, a leg portion 26 is provided on the blower motor 21 which extends toward the toe board 10 (refer to FIG. 1), and this leg portion 26 is locked in a recessed portion 27 formed in the toe board 10.

A bolt hole 28 is formed in the rear side of the duct 22. A bracket 29 extended from the steering support beam 5 is fixed to the rear side of the duct 22 by fastening a bolt 28a into the bolt hole 28. Accordingly, the steering support beam 5 and the blower unit 7 are integrally fixed to each other.

An end portion of the duct 22 is curved toward the front and is allowed to communicate with an opening 31 that is formed in a vertical wall surface 9a of the front bulkhead 9 for taking in outside air. A bracket 32 is provided at the end portion of the duct 22, whereby the end portion of the duct 22 is mounted to the vertical wall surface 9a of the front bulkhead 9 with a bolt 32a via the bracket 32.

On the other hand, as shown in FIG. 3, brackets 35 are provided on a rear side of the heater and ventilation unit 16 in such a manner as to extend leftward and rightward, respectively, therefrom. Accordingly, the heater and ventilation unit 16 is fastened to the lower panel 13 with bolts (not shown) via the brackets 35.

Brackets 36 are provided on a front side of the heater and ventilation unit 16 in such a manner as to extend upwardly. Accordingly, the heater and ventilation unit 16 is fastened to the vertical wall surface 9a of the front bulkhead 9 with bolts (not shown) via the brackets 36.

Next, mounting procedures for the aforesaid respective constituent members on the production line or the like will be described.

Firstly, an assembling mechanic integrally mounts the steering support beam 5 and the blower unit 7 to the lower panel 13 so as to construct a unitized component 40.

Namely, the mechanic disposes the steering support beam 5 on the upper portion of the glove box 14 of the lower panel 13 and fixes the steering support beam 5 to the lower panel 13 by fastening bolts from the interior of the glove box 14.

Furthermore, the mechanic disposes the blower unit 7 at a position along the wall surface of the glove box 14, and then fixes the blower main body 15 to the lower panel 13 by fastening bolts into the bolt holes 25 from the interior of the glove box 14. In addition, the mechanic fixes the blower main body 15 to the steering support beam 5 by fastening a bolt via the bracket 29. Furthermore, the mechanic fixes the heater and ventilation unit 16 to the lower panel 13 by fixing the brackets 35 to the lower panel 13 with bolts (not shown) from the inside of the lower panel 13.

Thus, the steering support beam 5 and the blower unit 7 are integrally assembled to the lower panel 13, whereby the unitized component 40 is constructed.

Next, the mechanic mounts the unitized component 40 to the vehicle body 1.

Namely, the mechanic fits the unitized component 40 into the vehicle body 1 while locking the leg portion 26 in the recessed portion 27 and mounts the steering support beam 5 to the vehicle body 1 via brackets (not shown).

Furthermore, after aligning the opening 31 with the duct 22 through working from the upper portion side of the lower panel 13, the mechanic fixes the bracket 32 to the vertical wall surface 9a of the front bulkhead 9 with a bolt. Then, the mechanic mounts the blower main body 15 to the vehicle body 1.

Then, the mechanic mounts the heater and ventilation unit 16 to the vehicle body 1 by fixing the brackets 36 to the vertical wall surface 9a of the front bulkhead 9 with bolts through working from the upper portion side of the lower panel 13 (not shown).

Thus, the unitized component 40 is mounted to the vehicle body 1. In other words, the lower panel 13, the steering support beam 5 and the blower unit 7 are integrally mounted on the vehicle body 1.

Next, after mounting the other components including a steering column (not shown) which are installed in the interior of the instrument panel 2 to the vehicle body 1, the mechanic mounts the upper panel 12 to the vehicle body 1.

According to the embodiment, the instrument panel 2 is formed in such a manner as to be vertically divided into the upper panel 12 and the lower panel 13. In addition, the lower panel 13, the steering support beam 5 and the blower unit 7 are mounted on the vehicle body 1 all together with the steering support beam 5 and the blower unit 7 being integrally assembled to the lower panel 13. Therefore, the number of man-hours on the production line can be reduced and hence the workability can be improved.

In this case, since the steering support beam 5 and the blower unit 7 can be mounted on the lower panel 13 at a location outside of the vehicle where good workability can be provided, the mounting workability and accuracy can be improved. In particular, since the steering support beam 5 is mounted on the lower panel 13 before they are mounted on the vehicle body 1, the mounting accuracy of each component can be improved, whereby a minimum gap can be set between them. Therefore, the space efficiency is improved. In addition, the rigidity of the lower panel 13 can be improved by unitizing the steering support beam 5 and the blower unit 7 onto the lower panel 13.

In addition, since it is constructed such that the opening 31 for taking in outside air is formed in the vertical wall surface 9a of the front bulkhead 9 for communication with and fixation to the duct 22 of the blower main body 15 for taking in the outside air, the mounting workability and accuracy can be improved.

Namely, since positioning of the duct 22 relative to the opening 31 and mounting of the duct 22 to the front bulkhead 9 can be implemented with ease while observing from the upper portion side of the lower panel 13, the mounting workability and accuracy can be improved.

Additionally, since mounting of the blower unit 7 to the toe board 10 can be implemented by engaging the leg portion 26 on the blower unit 7 side with the recessed portion 27 on the toe board 10 side, the necessity of doing the bolt fastening work with the uncomfortable posture of the mechanic is obviated, whereby the workability can be improved.

The blower unit 7 is integrally mounted on the lower panel 13 together with the steering support beam 5, and the blower unit 7 is mounted to the toe board 10 by engaging the leg portion 26 with the recessed portion 27. Therefore, since the fixing work of the blower unit 7 when it is mounted on the vehicle body 1 can be implemented only from the upper portion side of the lower panel 13, the necessity of doing the bolt fastening work with the uncomfortable posture of the mechanic is obviated. Whereby, the workability can be improved.

Note that while the embodiment of the present invention has been described with reference to the example in which the steering support beam 5 and the blower unit 7 are unitized onto the lower panel 13 so that the three components are mounted on the vehicle body 1 all together, the present invention is not limited thereto. The unitized component 40 may be constructed by unitizing the other components which are located at the lower portion of the interior of the instrument panel 2 so that those components can be mounted on the vehicle body 1 all together.

As has been described heretofore, according to the present invention, the workability and accuracy at which the blower unit is mounted can be improved.

What is claimed is:

1. A blower unit mounting structure comprising:
   an instrument panel including an upper panel and a lower panel that are vertically divided along a transverse direction of a vehicle body;
   a steering support beam fixed to the lower panel;
   a blower unit fixed to the lower panel and to the steering support beam to form a unitized component; and
   a toe board having a recessed portion, wherein said blower unit comprises a leg portion extended toward the toe board and engaged with the recessed portion.

2. The blower unit mounting structure as set forth in claim 1, further comprising:
   a front bulkhead that includes a vertical wall surface with an opening.

3. The structure of claim 1, wherein said lower panel is upwardly open to provide access from above to said blower unit to align a duct of said blower unit with an opening in a front bulkhead.

4. The structure of claim 3, wherein said duct extends from an upper part of said blower unit.

5. The structure of claim 1, wherein said blower unit comprises a duct for aligning with an opening in a vertical wall surface of a front bulkhead of said vehicle body.

6. The structure of claim 1, wherein said lower panel comprises a glove box fastened by an upper surface to said steering support beam.

7. The structure of claim 6, wherein said blower unit comprises a blower main body that is disposed along a front side to said glove box.

8. The structure of claim 6, wherein said blower unit comprises a heater and ventilation unit disposed along a side of said glove box.

9. A blower unit mounting structure comprising:
   an instrument panel including an upper panel and a lower panel that are vertically divided along a transverse direction of a vehicle body;
   a steering support beam fixed to the lower panel;
   a blower unit fixed to the lower panel and to the steering support beam to form a unitized component,
   a front bulkhead that includes a vertical wall surface with an opening; and
   a toe board having a recessed portion,
   wherein said lower panel is upwardly open to provide access to said blower unit from above, and
   wherein said blower unit comprises a leg portion extended toward the toe board and engaged with the recessed portion.

10. A blower unit mounting structure comprising:
    an instrument panel including an upper panel and a lower panel;
    a steering support beam connected to said lower panel;
    a blower unit connected to said steering support beam and said lower panel;
    a toe board having a recessed portion; and
    a leg portion extended toward the toe board and engaged with the recessed portion.

11. The structure of claim 10, wherein said lower panel is upwardly open to provide access from above to said blower unit to align a duct of said blower unit with an opening in a front bulkhead.

12. The structure of claim 10, wherein said blower unit comprises a duct for aligning with an opening in a vertical wall surface of a front bulkhead of a vehicle body.

13. The structure of claim 10, wherein said lower panel comprises a glove box fastened by an upper surface to said steering support beam.

14. The structure of claim 13, wherein said blower unit comprises a blower main body that is disposed along a front side to said glove box.

15. The structure of claim 13, wherein said blower unit comprises a heater and ventilation unit disposed along a side of said glove box.

* * * * *